United States Patent

Ribas-Corbera et al.

[11] Patent Number: 6,111,991
[45] Date of Patent: Aug. 29, 2000

[54] METHOD AND APPARATUS FOR OPTIMIZING QUANTIZER VALUES IN AN IMAGE ENCODER

[75] Inventors: Jordi Ribas-Corbera, Vancouver; Shaw-Min Lei, Camas, both of Wash.

[73] Assignee: Sharp Laboratories of America, Camas, Wash.

[21] Appl. No.: 09/008,137

[22] Filed: Jan. 16, 1998

[51] Int. Cl.[7] .............................. G06K 9/36; G06K 9/38; H04N 7/12
[52] U.S. Cl. .......................... 382/251; 382/232; 382/238; 382/270; 348/405
[58] Field of Search .................................... 382/239, 251, 382/270, 271, 272, 273, 238, 232; 348/405, 415

[56] References Cited

U.S. PATENT DOCUMENTS

| | | | |
|---|---|---|---|
| 5,724,453 | 3/1998 | Ratnakar et al. | 382/251 |
| 5,745,178 | 4/1998 | Hartung et al. | 382/251 |
| 5,757,434 | 5/1998 | Klein Gunnewiek et al. | 382/251 |
| 5,768,436 | 6/1998 | Keesman | 382/251 |
| 5,790,196 | 8/1998 | Sun et al. | 382/251 |
| 5,822,461 | 10/1998 | Choi | 382/251 |
| 5,832,125 | 11/1998 | Reese et al. | 382/239 |
| 5,903,673 | 5/1999 | Wang et al. | 382/239 |

*Primary Examiner*—Phuoc Tran
*Assistant Examiner*—Daniel G. Mariam
*Attorney, Agent, or Firm*—Marger Johnson & McCollom

[57] ABSTRACT

A quantizer controller identifies a target bit value equal to a total number of bits available for encoding a frame. A total amount of distortion in the frame is modeled according to predicted quantization values for each one of the blocks. The predicted quantization values are characterized according to an amount of energy in each block and a number of bits available for encoding each block. Quantization values for each block are optimized by minimizing the modeled distortion in the frame subject to the constraint that the total number of bits for encoding the frame is equal to the target bit value. Each block is then encoded with the optimized quantization value.

28 Claims, 6 Drawing Sheets

METHOD AND APPARATUS FOR OPTIMIZING QUANTIZER VALUES IN AN IMAGE ENCODER

BACKGROUND OF THE INVENTION

The invention relates to computing quantization values used for encoding coeffients of a digital image or video frame and more particularly to optimizing the computed quantization values to reduce distortion in the digital image or video frame when encoding is performed with a limited number of bits.

In many of today's image and video coders, the quality of encoded images is controlled by selecting one or more quality parameters. Block-based image and video coders, use a parameter known as a quantization scale or step for each block of pixels in the image. The quantization steps are used for scaling pixel values within the same step ranges to the same values. Image blocks encoded with the same quantization scale have approximately the same quality. The number of bits needed for encoding an image depends on desired image quality (quantization scales) and on the inherent statistics of the image. As a result, different images encoded with the same scales (same image quality) will occupy a different number of bits.

In many applications, the number of bits available for encoding one or several frames is fixed in advance, and some technique is necessary to select the quantization scales that will produce that target number of bits and encode the video frames with the highest possible quality. For example, in a digital video recording, a group of frames (GOP) must occupy the same number of bits for an efficient fast-forward/fast-rewind capability. In video telephony, the channel rate, communication delay, and size of encoder buffers determine the available number of bits for one or more frames.

Existing quantizer or buffer control methods are classified into three major types. A first type of quantizer control method encodes each image block several times with a set of quantization scales. The number of bits produced for each case is measured and a scale for each block is smartly selected so the sum of the bits for all combined blocks hits the desired target bit number. The first type of quantizer control techniques cannot be used for real-time encoding because of the high computational complexity required to encode each image block multiple times.

The first type of quantizer control is described in the following publications: K. Ramchandran, A. Ortega, and M. Vetterli, "Bit Allocation for Dependent Quantization with Applications to Multi-Resolution and MPEG Video Coders," IEEE Trans. on Image Processing, Vol. 3, N. 5, pp. 533–545, September 1994; W. Ding and B. Liu, "Rate Control of MPEG Video Coding and Recording by Rate-Quantization Modeling," IEEE Trans. on Circuits and Systems for Video Technology, Vol. 6, N. 1, pp. 12–19, February 1996; and L. J. Lin, A. Ortega, and C. C. J. Kuo, "Rate Control Using Spline-interpolated R-D Characteristics," Proc. of SPIE Visual Communications and Image Processing, pp. 111–122, Orlando, Fla., March 1996.

A second type of quantizer control technique measures the number of bits spent in previously encoded image blocks and measures other parameters such as, buffer fullness, block activity, etc. These measurements are used to select the quantization scale for the current block. The second type of quantizer control is popular for real-time encoding because of its low computational complexity. However, the second type of quantizer control is inaccurate in achieving the target number of bits and must be combined with additional encoding techniques to avoid bit or buffer overflow and underflow.

The second method is described in the following publications: U.S. Pat. No. 5,038,209 entitled "Adaptive Buffer/Quantizer Control for Transform Video Coders", issued Aug. 6, 1991 to H. M. Ming; U.S. Pat. No. 5,159,447 entitled "Buffer Control for Variable Bit-Rate Channel", issued Oct. 27, 1992 to B. G. Haskell and A. R. Reibman; and U.S. Pat. No. 5,141,383 entitled "Pseudo-Constant Bit Rate Video Coding with Quantization Parameter Adjustment", issued Aug. 31, 1993 to C. T. Cheng and A. H. Wong.

A third type of quantizer control technique uses a model to predict the number of bits needed for encoding the image blocks. The quantizer model includes the blocks' quantization scales and other parameters, such as, block variances. The quantization scales are determined by some mathematical optimization of the encoder model. The third type of quantizer control is computationally simple and can be used in real-time, but is highly sensitive to model errors and often produces inaccurate results.

The third type of quantizer control technique is described in the following publications. E. D. Frimout, J. Biemond, and R. L. Lagendik, "Forward Rate Control for MPEG Recording," Proc. of SPIE Visual Communications and Image Processing, Cambridge, Mass., pp. 184–194, November 1993; U.S. Pat. No. 5,323,187 entitled, "Image Compression System by Setting Fixed Bit Rates", issued Jun. 21, 1994 to K. Park and A. Nicoulin, "Composite Source Modeling for Image Compression," Ph.D. Thesis N. 1444 (1995), Ecole Polytechnique Federale de Lausanne, Chapter 6, 1995.

Thus, a need remains for improving the image quality of quantized image or video frames while reducing the time and computational complexity required to generate optimized quantization values.

SUMMARY OF THE INVENTION

A quantizer controller generates quantization values using a new block-adaptive, Lagrangian optimization. The quantizer controller is updated and improved using information from earlier quantized blocks. The quantizer controller is robust to model errors and produces results as accurate as type-1 quantizer control techniques, while having the simpler computational complexity of the type-2 quantizer control techniques.

The quantizer controller identifies a target bit value equal to a total number of bits available for encoding the frame. A total amount of distortion in the frame is modeled according to the predicted quantization values assigned to each one of the blocks. The predicted quantization values are characterized according to an amount of energy in each block and a number of bits available for encoding each block. Optimum quantization values are adapted to each block by minimizing the modeled distortion in the frame subject to the constraint that the total number of bits for encoding the frame is equal to the target bit value. Each block is then encoded with the optimized quantization value.

The quantizer controller is adaptive to each block by reducing quantization values for the blocks having less energy and increasing the quantization values for the blocks having more energy. The quantization values assigned to the blocks are also optimized according to a number of image blocks remaining to be encoded and a number of bits still available for encoding the remaining image blocks.

Different weighting factors are optionally applied to the quantization values that vary the accuracy of the encoded blocks. One weighting factor is applied to the quantization values according to the location of the block in the frame. Optimized quantization values are applied to blocks in each frame, frames in a group of multiple frames or applied generally for any region in an array of image data.

The quantizer controller only encodes the image once to accurately generate the quantization values for each block. The quantization values produce a target number of bits for the encoded image or video frame. Thus, the quantizer controller is less computationally exhaustive than a quantizer control technique of similar accuracy.

The general framework of the quantizer controller can be used in a variety of quantizer/rate control strategies. For example, the quantizer controller can be used to select in real-time the value of the quantization scales for the Discrete Cosine Transform DCT-based encoding of the frame macroblocks in the current video coding standards MPEG 1–2 and 4, H.261, H.263, and H.263+. A frame, several frames, or several macroblocks within a frame are encoded with a fixed number of bits.

The foregoing and other objects, features and advantages of the invention will become more readily apparent from the following detailed description of a preferred embodiment of the invention, which proceeds with reference to the accompanying drawings.

DETAILED DESCRIPTION

A block-based image coder 12 is used to describe the invention. However, the invention can be used for controlling the quantizer of any image or video coder.

Figure 1:
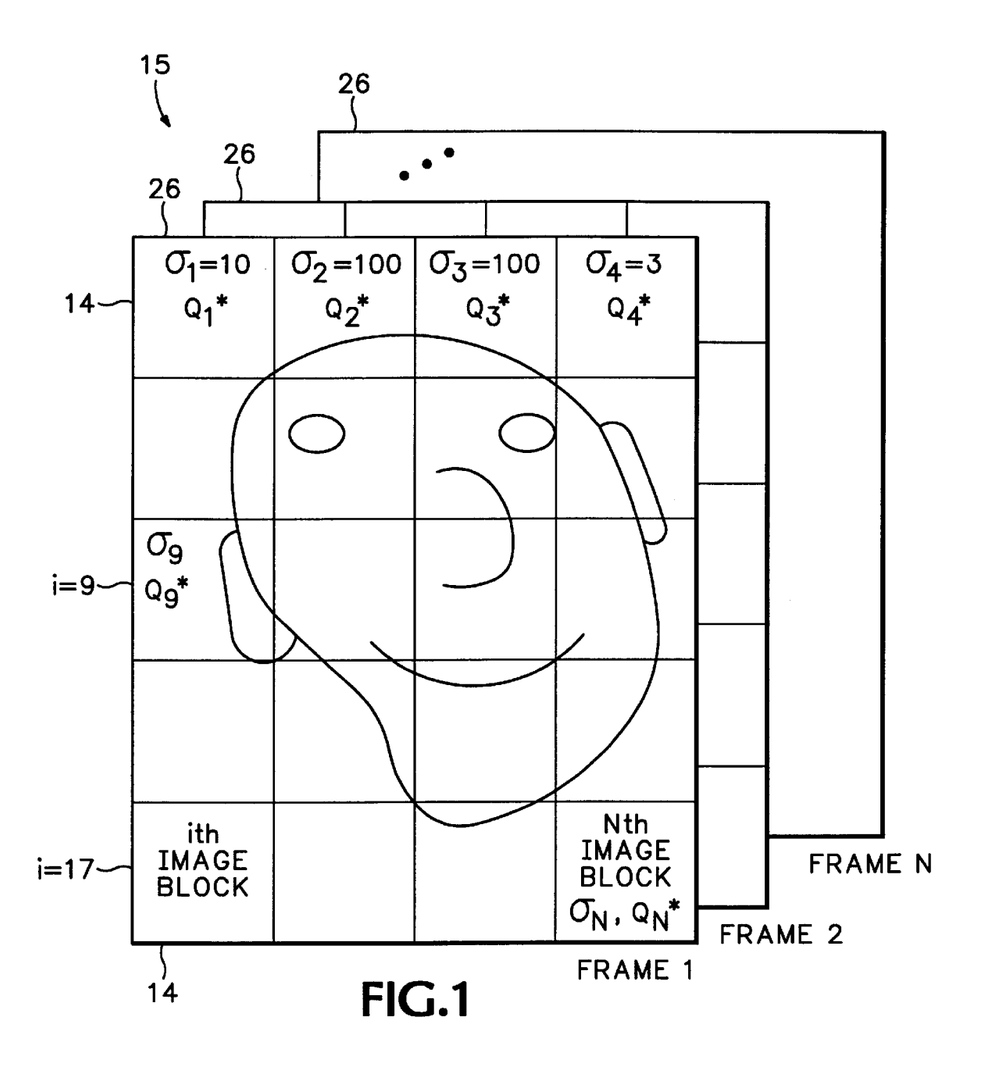
FIG. 1 is a schematic diagram of multiple image frames each including multiple blocks assigned optimized quantization values according to the invention.

Referring to FIG. 1, in block-based image coding, images 15 are transmitted in multiple frames 26. Each frame 26 is decomposed into multiple image blocks 14 of the same size, typically of 16×16 pixels per block. The number of bits $B_i$ produced after encoding an ith image block 14, is a function of the value of a quantization parameter $Q_i$ and the statistics of the block. For example, image block i=9 contains more image information (energy) $\sigma_i$ than image block i=17. This is because the image in block i=9 contains portions of a facial image along with background information. Conversely, image block i=17 has less image information energy $\sigma_i$ because it contains substantially the same background imagery in substantially each pixel location.

Figure 2:
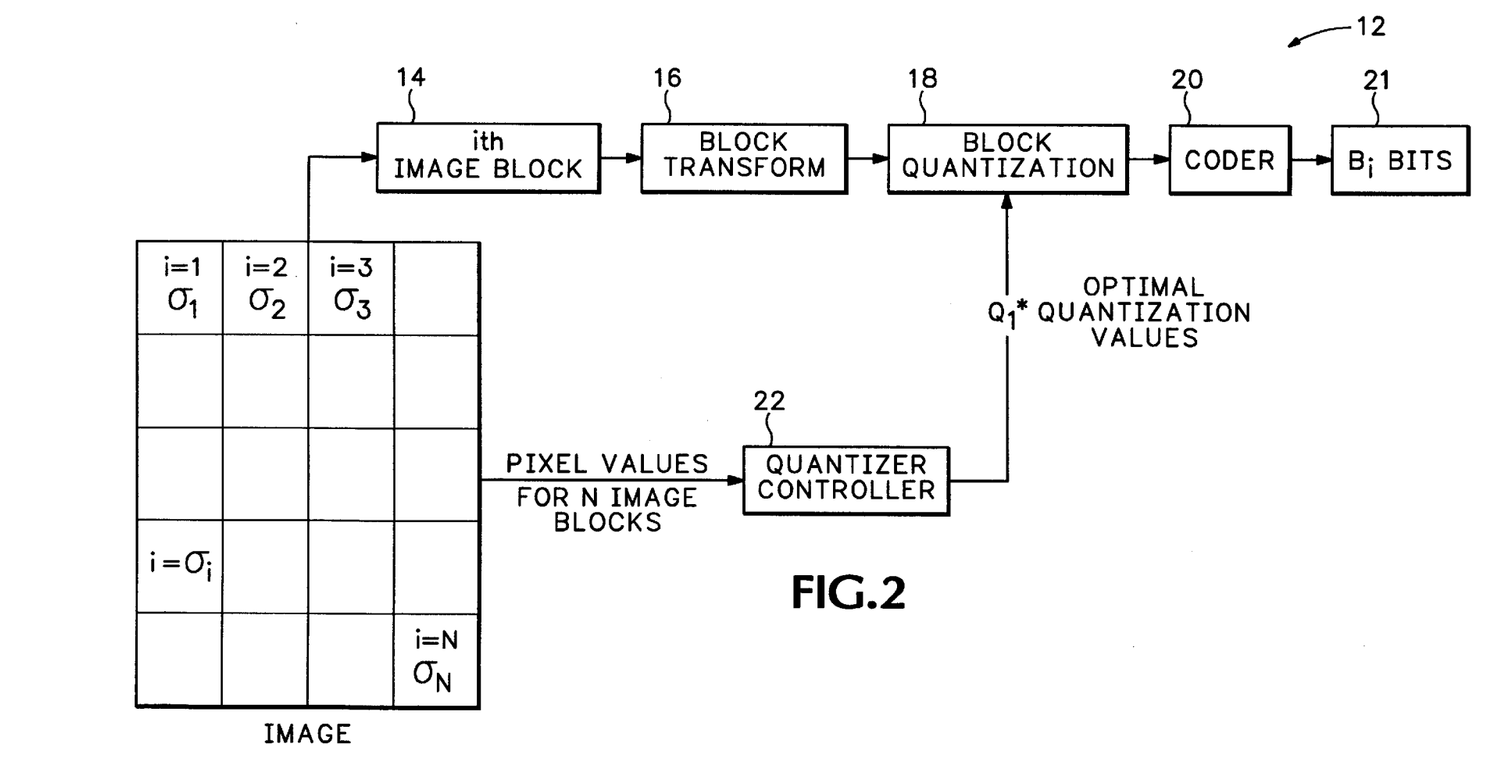
FIG. 2 is a block diagram of an image coder according to one embodiment of the invention.

Referring to FIG. 2, the pixel values for each image block 14 are transformed into a set of coefficients, for example using a Discrete Cosine Transform (DCT) in block transform 16. These coefficients are quantized in block quantization 18 and encoded in coder 20. Bits $B_i$ of the encoded and quantized image blocks 14 are then transmitted over a communication channel 21 over a telephone line, microwave channel, etc. to a receiver (not shown). The receiver includes a decoder that decodes the quantized bits and an inverse transform block that performs an Inverse Discrete Cosine Transform (IDCT). The decoded bits $B_i$ are then displayed on a visual display screen to a user.

Quantization of the transformed coefficients in quantization block 18 is a key procedure since it determines the quality with which the image block 14 will be encoded. The quantization of the ith block 14 is controlled by the parameter, $Q_i$. In the H.261 and H.263 video coding standards, $Q_i$ is known as the quantization step for the ith block and its value corresponds to half the step size used for quantizing the transformed coefficients. In the MPEG-1 and MPEG-2 standards, $Q_i$ is called the quantization scale and the jth coefficient of a block is quantized using a quantizer of step size $Q_i w_j$, where $w_j$ is the jth value of a quantization matrix chosen by the designer of the MPEG codec.

Let N be the number of 16×16 image blocks in one image frame 26. The total number of bits B available for encoding one image frame 26 is:

$$B = B_1 + B_2 + B_3 + \ldots + B_N, \quad (1)$$

where the value of B depends on the quantization parameters selected, $Q_1, Q_2, \ldots, Q_N$, and the statistics of the blocks. The invention comprises a quantizer controller 22 (FIG. 2) that chooses optimum values for the $Q_i$'s for a limited total number of available bits B for encoding the frames 26. The quantizer controller 22 (FIG. 2) is implemented in a variety of different maps including in software in a programmable processing unit with dedicated hardware.

In image coding, the image blocks 14 are said to be intracoded or of class intra. In video coding, many of the blocks 14 in a frame 26 are very similar to blocks in previous frames. The values of the pixels in a block 14 are often predicted from previously encoded blocks and only the difference or prediction error is encoded. These blocks are said to be interceded or of class inter. The invention can be used in frames with both intra and inter blocks.

Encoder Model

The following model in equation 2 identifies the number of bits invested in the ith image block:

$$B_i = A\left(K \frac{\sigma_i^2}{Q_i^2} + C\right), \quad (2)$$

The value $Q_i$ is the quantizer step size or quantization scale, A is and used as a scaling factor and is the number of pixels in a block or region (e.g., in MPEG and H.263 A=$16^2$ pixels), K and C are constants and used as scaling factors, and $\sigma_i$ is the empirical standard deviation of the pixels in the block, $$\sigma_i = \sqrt{\frac{1}{A}\sum_{j=1}^{A}(P_i(j) - \overline{P}_i)^2}. \quad (3)$$

The value $P_i(j)$ is the jth pixel in the ith block and $\overline{P}_i$ is the average of the pixel values in the block where, $$\overline{P}_i = \frac{1}{A}\sum_{j=1}^{A} P_i(j). \quad (4)$$

For color images, the $P_i(j)$'s are the values of the luminance and chrominance components of the respective pixels. The model in equation 2 is derived using a rate-distortion analysis of the block's encoder. The value of K in equation 2 depends on the statistics of the image blocks 14 and the quantization matrix used in the encoder. For example, it can be shown that if the pixel values are approximately uncorrelated and Gaussian distributed, and the quantization matrix is flat with unitary weights (i.e., $w_j=1$ for all j), then $K=\pi/\ln 2$. The constant C in equation 2 models the average number of bits per pixel used for encoding the coder's overhead. For example, C accounts for header and syntax information, pixel color or chrominance components, transmitted Q values, motion vectors, etc. sent to the receiver for decoding the image blocks. If the values of K and C are not known, they are estimated with an inventive technique described below in the section entitled, "Updating the Parameters of the Encoder Model".

Equation 5 models distortion D for the N encoded blocks, $$D = \frac{1}{N}\sum_{i=1}^{N}\alpha_i^2\frac{Q_i^2}{12}, \quad (5)$$

where the $\alpha_i$'s are weights chosen to incorporate the importance or cost of the block distortion. For example, larger $\alpha_i$'s are chosen for image blocks having artifacts more visible to the human eye or for image blocks that belong to more important objects in the scene. If $\alpha_1=\alpha_2=\ldots=\alpha_N=1$, the distortion represented by equation 5 is approximately the mean squared error (MSE) between the original and encoded blocks.

Optimization

The quantizer controller 22 (FIG. 2) selects the optimal quantization values, $Q^*_1, Q^*_2, \ldots, Q^*_N$, that minimize the distortion model in equation 5, subject to the constraint that the total number of bits must be equal to B as defined in equation 1, which can be expressed mathematically as follows:

$$Q^*_1, \ldots, Q^*_N = \operatorname*{argmin}_{\substack{Q_1,\ldots,Q_N;\\ \sum_{j=1}^{N}B_j=B}} \frac{1}{N}\sum_{j=1}^{N}\alpha_j^2\frac{Q_j^2}{12} \quad (6a)$$

The next objective is to find a formula for each of the $Q_i^*$'s. To do this, the method of Lagrange is used to convert the constrained-minimization in equation (6a) to the following:

$$Q^*_1, \ldots, Q^*_N = \operatorname*{argmin}_{Q_1,\ldots,Q_N} \frac{1}{N}\sum_{i=1}^{N}\alpha_j^2\frac{Q_j^2}{12} + \lambda\left(\sum_{j=1}^{N}B_j - B\right), \quad (6b)$$

where $\lambda$ is called the Lagrange multiplier. Next, equation (2) is used for $B_j$ in (6b) to obtain:

$$Q^*_1, \ldots, Q^*_N = \operatorname*{argmin}_{Q_1,\ldots,Q_N} \frac{1}{N}\sum_{j=1}^{N}\alpha_j^2\frac{Q_j^2}{12} + \lambda\sum_{j=1}^{N}A\left(K\frac{\sigma_j^2}{Q_j^2} + C\right) - \lambda B \quad (6c)$$

Finally, by setting partial derivatives in (6c) to zero, the following formula is derived for the optimal quantizer step size for the i-th image block:

$$Q_i^* = \sqrt{\frac{AK}{(B-ANC)}\frac{\sigma_i}{\alpha_i}\sum_{k=1}^{N}\alpha_k\sigma_k}. \quad (6)$$

Moreover, if i−1 blocks 26 have already been quantized and encoded, the optimal quantization parameter for the ith block is, $$Q_i^* = \sqrt{\frac{AK}{(\tilde{B}_i - AN_iC)}\frac{\sigma_i}{\alpha_i}\sum_{k=1}^{N}\alpha_k\sigma_k}, \quad (7)$$

where $$\frac{AK_i}{(B_i - \tilde{A}N_iC_i)}$$

is defined as a group of scaling factors where $N_i=N-i+1$ is one of the scaling factors and is the number of image blocks or regions that remain to be encoded and $\tilde{B}_i$ is another one of the scaling factors and is the number of bits available to encode the remaining image blocks or regions, $$\tilde{B}_i = B - \sum_{j=1}^{i-1}B_j = \tilde{B}_{i-1} - B_{i-1} = \tilde{B}_{i-1} - A\left(K\frac{\sigma_{i-1}^2}{Q_{i-1}^{*2}} + C\right), \quad (8)$$

where $B_{i-1}$ is obtained using equation 2 with the optimized quantization value $Q_{i-1}^*$. Thus, equations 6 and 7 generate optimized quantization values that minimize distortion for a limited number of available bits. As a result, using the same number of bits, the image in frame 26 in FIG. 1 will have less distortion than other quantization schemes when displayed on a display unit at the receiver end of the channel 21.

QUANTIZER CONTROL METHOD

Figure 3:
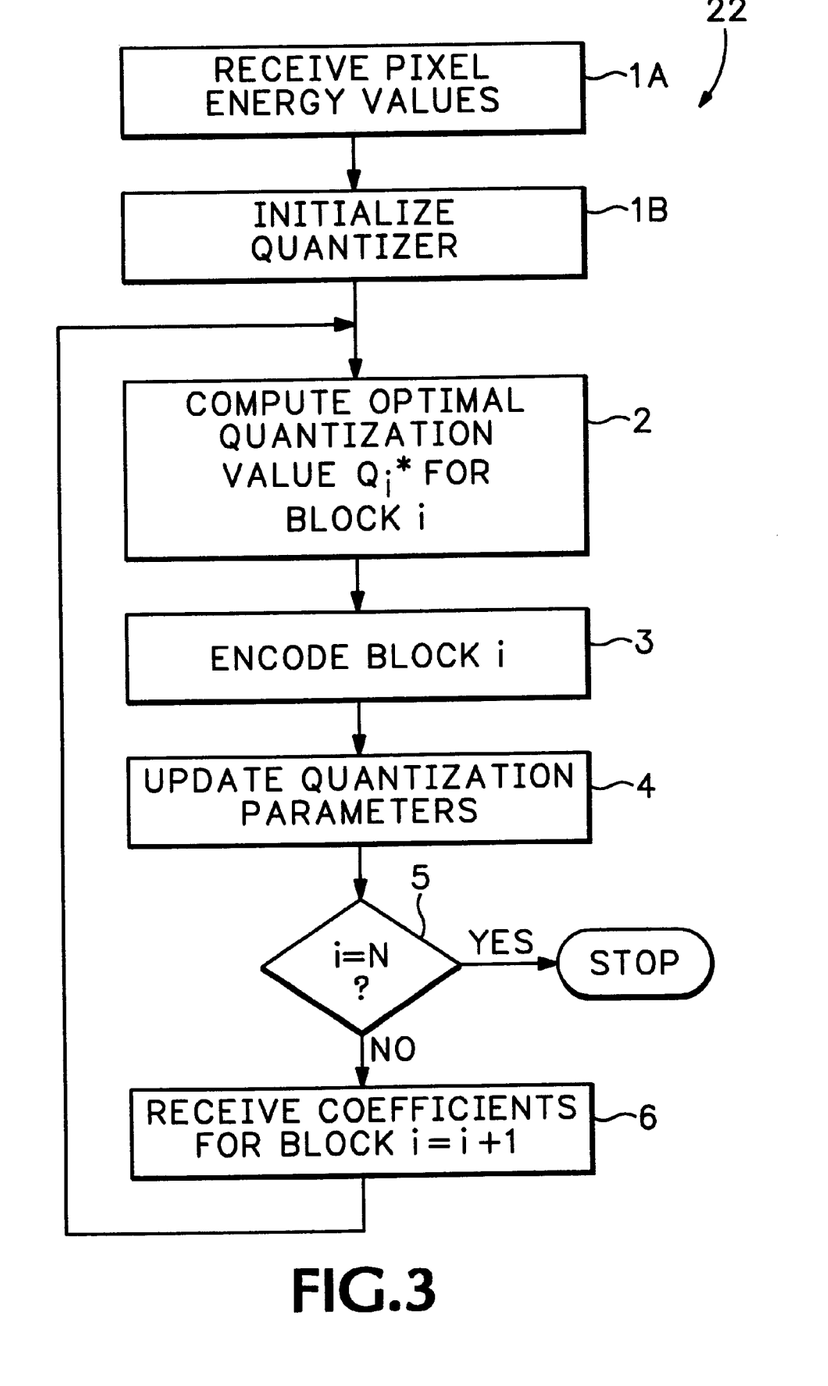
FIG. 3 is a step diagram for generating the optimized quantization values.

FIG. 3 describes the steps performed by quantizer controller 22 (FIG. 2) for selecting quantizer values used for encoding N image blocks 14 with B bits. Note that N could be the number of blocks in an image, part of an image, several images, or generally any region of an image.

Step 1. Receive energy values and initialization.

Pixel values for the N image blocks are obtained to the quantizer controller 22 from the digital image (FIG. 2) in step 1A. Initialization is performed in step 1B by setting i=1 (first block), $\tilde{B}_1=B$ (available bits), $N_1=N$ (number of blocks). Let $$S_1 = \sum_{k=1}^{N}\alpha_k\sigma_k,$$

where the $\sigma_k$'s are found using equation 3 and the $\alpha_k$'s are preset (e.g., set $\alpha_1=\alpha_2=\ldots=\alpha_N=1$ to minimize mean squared error). In one example, the amount of energy $\sigma_i$ is derived from the DCT coefficients of the pixel values generated by transform block 16.

For a fixed mode, the values of the parameters K and C in the encoder model in equation 7 are known or estimated in advance. For example, using linear regression, $K_1=K$ and $C_1=C$. For an adaptive mode, the model parameters are not known, $K_1$ and $C_1$ are then set to some small non-negative values. For example, experiments have shown $K_1=0.5$ and $C_1=0$ to be good initial estimates. In video coding, $K_1$ and $C_1$ can be set to the values $K_{N+1}$ and $C_{N+1}$, respectively, from the previous encoded frame.

Step 2. Compute the optimal quantization parameter for the ith block.

If the values of the Q-parameters are restricted to a fixed set (e.g., in H.263, QP=$Q_i/2$ and takes values 1,2,3, ..., 31,), $Q_i^*$ is rounded to the nearest value in the set. The square root operation is then implemented using look-up tables, where $$Q_i^* = \sqrt{\frac{AK_i}{(\tilde{B}_i - AN_iC_i)} \frac{\sigma_i}{\alpha_i} S_i}$$

Step 3. Encode the ith block with a block-based coder.

$B_i'$ is the number of bits used to encode the ith block, compute $\tilde{B}_{i+1}=\tilde{B}_i-B_i'$, $S_{i+1}=S_i-\alpha_i\sigma_i$, and $N_{i+1}=N_i-1$.

Step 4. Update quantizer values.

In step 4, the parameters $K_{i+1}$ and $C_{i+1}$ are updated in the quantizer controller 22. For the fixed mode, $K_{i+1}=K$, $C_{i+1}=C$. For the adaptive mode, the updates $K_{i+1}$ and $C_{i+1}$ are found using a model fitting technique. One example of a model fitting technique is described below in the section entitled "Updating Parameters in the Quantizer controller".

Step 5. Generate quantizer value for next block.

If i=N in decision step 5, quantization values have been derived for all image blocks 14 and the quantizer controller 22 stops. If all of the image blocks 14 have not been quantized, the quantizer controller 22 receives the coefficients for the next image block i=i+1 in step 6, and jumps back to step 2. The quantization value for block i=i+1 are then derived as described above.

Figure 4:
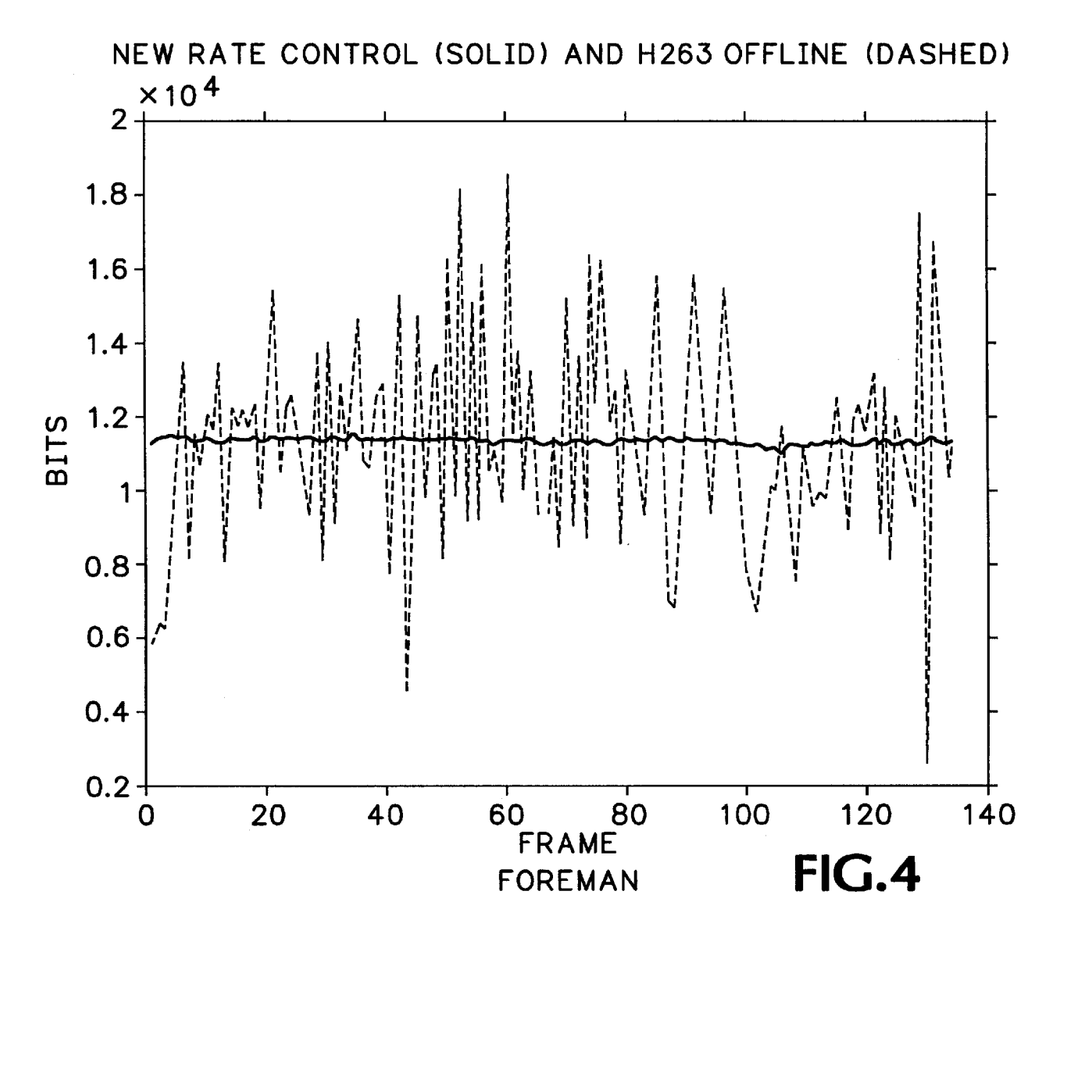
FIGS. 4 and 5 show results from applying the optimized quantization values to image data.
Figure 5:
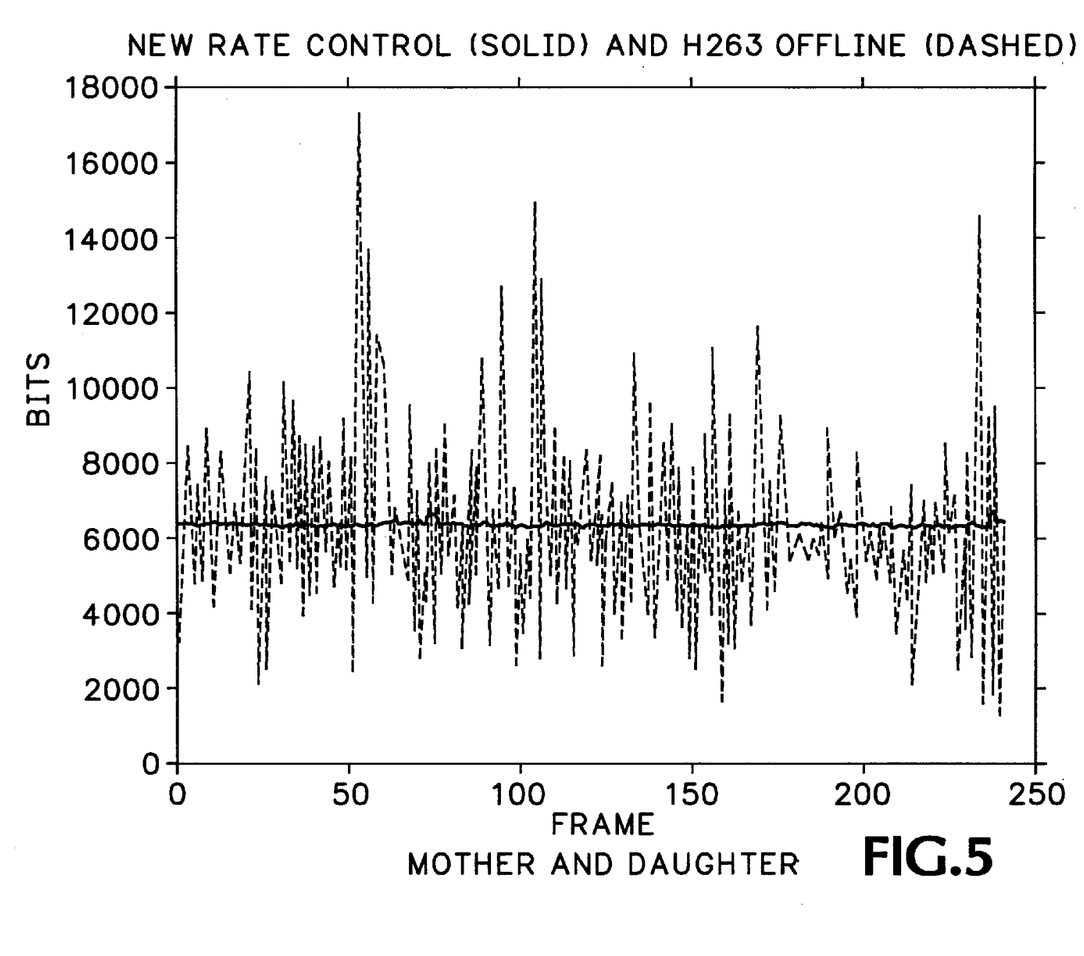

Referring to FIGS. 4 and 5, the frames of video sequences encoded by quantizer controller 22 (FIG. 2) where compared to those of a Telenor H.263 offline method, which is the quantizer control technique adopted for MPEG-4 anchors.

In FIG. 4, the total number of bits per video frame obtained by the quantization technique described in FIG. 3 are shown in solid line. The H.263 offline encoding technique is shown in dashed line. Encoding was performed on 133 frames of a well-known video sequence "Foreman". The target number of bits B is 11200 bits per frame. FIG. 5 is like FIG. 4, but for 140 frames of the video sequence "Mother and Daughter" with B=6400.

The quantizer controller 22 produces a significantly more accurate and steady number of bits per frame. Similar results were obtained for a wide range of bit rates. In the experiments, there were little if no visible differences in the quality of the two encoded video sequences. The signal to noise ratio performance of the images processed by quantizer controller 22 (FIG. 2) was only 0.1–0.3 dB lower on average. Thus, even though the image is only encoded once, quantizer controller 22 achieves the target bit rate accurately with high image quality at every frame.

Alternative Implementations

Several quantization variations are based on the base quantization optimization framework discussed above. If the computation of all $\sigma_k$'s in Step 1B of FIG. 3 cannot be performed in advance, a good estimate for $S_1$ is used, such as the value of $S_1$ from the previous video frame 26.

A low-complexity estimate of $S_1$ can be used, in order to further reduce computational complexity. For the low complexity estimate, equation 3 is replaced by equation 9, $$\sigma_i = \frac{1}{A} \sum_{j=1}^{A} \mathrm{abs}(P_i(j) - \bar{P}_i), \quad (9)$$

where abs(x) is the absolute value of x. In video coding, the mean value of pixels in inter blocks is usually zero and hence equation 9 may be simplified by setting $\bar{P}_i=0$.

A fixed optimization selects the quantization parameters using equation 6 instead of equation 7. To do this, in step 3 in FIG. 3, the values for $\tilde{B}_{i+1}$, $S_{i+1}$, and $N_{i+1}$ are replaced by $\tilde{B}_{i+1}=B$, $S_{i+1}=S_1$, and $N_{i+1}=N$, respectively.

For a variable-rate channel, if the number of bits available after encoding i blocks changes to $\hat{B}$, because of a change of channel rate or other factors, set $\tilde{B}_{i+1}=\hat{B}$ in step 3.

The quantization model defined in equation 2 can be generalized to equation 10, $$B_j = A_j\left(K\frac{\sigma_j^\phi}{Q_j^\gamma} + C\right), \quad (10)$$

where $A_j$ is the number of pixels in the jth region. The region of quantization does not need to be a block. Additional model parameters $\phi$ and $\gamma$ can either be set prior to quantization or obtained using parameter estimation techniques described below. If the quantization model in equation 10 is used in step 2, the optimized quantization values $Q_i^*$'s are derived using equation 11, $$Q_i^* = \left(\frac{KA_i^{\frac{\gamma}{\gamma+2}} \sigma_i^{\frac{\phi\gamma}{\gamma+2}}}{\tilde{B}_i - C\sum_{n=i}^{N} A_n \alpha_i^{\frac{2\gamma}{\gamma+2}}} S_i\right)^{\frac{1}{\gamma}}, \quad (11)$$

in step 1 $S_1$ is replaced by $$S_1 = \sum_{n=1}^{N} (A_n \sigma_n^\phi)^{\frac{2}{\gamma+2}} \alpha_n^{\frac{2\gamma}{\gamma+2}}.$$

In step 3, $S_{i+1}$ is replaced by $$S_{i+1} = S_i - (A_i \sigma_i^\phi)^{\frac{2}{\gamma+2}} \alpha_i^{\frac{2\gamma}{\gamma+2}}.$$

Encoding Intra and Inter Blocks.

If some of the blocks to be encoded are of class intra (in the same frame) and some inter (between different frames), performance of the quantizer controller 22 (FIG. 2) can be improved by dividing the standard deviation of the intra blocks by a factor $\sqrt[3]{\beta}$. Specifically, after computing the value for the $\sigma_k$'s in step 1, the factor $\sqrt[3]{\beta}$ is applied as follows:

$$\sigma_k = \begin{cases} \frac{\sigma_k}{\sqrt[3]{\beta}} & \text{if } k\text{th block is intra} \\ \sigma_k & \text{otherwise} \end{cases}.$$

The factor $\beta$ is, $$\beta = \frac{K_P}{K_I}.$$

The values $K_I$ and $K_p$ are the averages of the K's measured for the intra and inter blocks, respectively. The value of $\beta$ is estimated and updated during encoding. During experimentation it was found that using a constant $\beta=3$ works well.
Frame-Based Quantizer Control.

If the quantization step is fixed for all the blocks 14 within a frame 26, the same quantizer controller 22 shown in FIG. 2 can be used for encoding one or several frames. The parameters are reinterpreted so that: N=Number of frames, B=Bits available for encoding the N frames, i=Frame number in the video sequence, $Q_i$=Quantization step for all the blocks in the ith frame, and A=Number of pixels in a frame.

The parameters $\alpha_i, \sigma_i, B_i'$, are the weight, variance, and bits for the ith frame, respectively. The parameters $K_i$ and $C_i$ are updates of the coder model for that frame.

If computational complexity is not an issue, each image block 14 can be encoded several times and, using a classical model fitting procedure (e.g., least-squares fit, linear regression, etc.), a good estimate of the $K_i$'s and $C_i$'s for the blocks can be found in advance. Then, in step 2, the quantization values $Q_i^*$ are determined according to, $$Q_i^* = \sqrt{\frac{A\sqrt{K_i}}{\left(\tilde{B}_i - A\sum_{i=1}^{N} C_i\right)} \frac{\sigma_i}{\alpha_i} S_i}.$$

In Step 1, $S_1$ is replaced by $$S_I = \sum_{k=1}^{N} \sqrt{K_k}\, \sigma_k \alpha_k,$$

and in step 3, $S_{i+1}$ is replaced by $$S_{i+1} = S_i - \sqrt{K_i}\, \sigma_i \alpha_i.$$

To reduce the complexity, one can set $C=C_i=0$ and avoid the updating and computation of this model parameter. In that case, observe that $Q_i^*$ in step 2 is simply, $$Q_i^* = \sqrt{\frac{AK_i}{\tilde{B}_i} \frac{\sigma_i}{\alpha_i} S_i},$$

or equivalently, $$Q_i^* = \sqrt{\frac{A_i}{T_i}}, \text{ where } A_i = AK_i \text{ and } T_i = \frac{\alpha_i \sigma_i}{S_i} \tilde{B}_i.$$

Any subset of the different techniques described in "Alternative Implementations" can be combined and used together.
Updating Parameters of the Encoder Model.

The following is one technique for updating the parameters $K_{i+1}$ and $C_{i+1}$ in the quantizer controller 22 (FIG. 2). This update technique is used with the adaptive mode described above in step 4. Other classical parameter estimation or model fitting techniques such as least squares, recursive least squares, Kalman prediction, etc. can alternatively be used. The model parameters can be updated in every block, frame, group of blocks, or group of frames.

The model parameters in one embodiment of the invention, are updated or estimated on a block-by-block basis using the following weighted averages, $$\hat{K}_i = \frac{(B_i' - AC_i)Q_i^{*2}}{A\sigma_i^2}, \text{ and } \hat{C}_i = \frac{B_i'}{A} - K_i \frac{\sigma_i^2}{Q_i^{*2}}.$$

The values of K and C predict $B_i'$ using equation 2. Alternatively, in some codecs these formulas are used for measuring $\hat{K}_i$ and $\hat{C}_i$:

$$\hat{K}_i = \frac{B_{DCT,i}' Q_i^{*2}}{A\sigma_i^2}, \text{ and } \hat{C}_i = \frac{B_i' - B_{DCT,i}'}{A},$$

where $B_{DCT,i}'$ is the number of bits spent for the DCT coefficients of the i-th image block.

The averages of the $\hat{K}_i$'s and $\hat{C}_i$'s are computed as follows, $$\tilde{K}_i = \frac{i-1}{i}\tilde{K}_{i-1} + \frac{1}{i}\hat{K}_i, \text{ and } \tilde{C}_i = \frac{i-1}{i}\tilde{C}_{i-1} + \frac{1}{i}\tilde{C}_i.$$

The updates are a linearly weighted average of $\tilde{K}_i$, $\tilde{C}_i$ and their respective initial estimates $K_1$, $C_1$, $$K_{i+1} = \frac{i}{N}\tilde{K}_i + \frac{N-i}{N}K_1, \text{ and } C_{i+1} = \frac{i}{N}\tilde{C}_i + \frac{N-i}{N}C_1.$$

If the general model in equation 10 is used, a variety of estimators can be used to estimate the additional parameters $\phi$ and $\gamma$. These parameters can also be updated on a block-by-block basis, and the ith updates $\phi_i$ and $\gamma_i$ can be found using averaging techniques similar to those for $K_i$, $C_i$.
Selection of the $\alpha_i$ Weights.

The $\alpha_i$ values can be chosen to incorporate the importance or weight of block distortions. If default values are used $\alpha_1=\alpha_2=\ldots=\alpha_N=1$, the MSE distortion is minimized between the original and the encoded blocks. Otherwise, the MSE distortion decreases in blocks with larger $\alpha_i$'s and increases where the $\alpha_i$'s are smaller. Two examples are described below for choosing the $\alpha_i$ weights. A region, such as a rectangular window in a video telephone image, is assigned a larger value of $\alpha_i$ and, in turn, smaller quantization values. The weighted region will be coded with better quality since a smaller quantization scale is used to quantize pixel values.

People usually pay more attention to the central region of a picture. Thus, larger values of $\alpha_i$ are assigned to the regions near the center of the picture. A pyramid formula is used to assign larger values of $\alpha_i$ to blocks closer to the center of the frame. Specifically, let $B_X$ and $B_Y$ be the number of blocks along the horizontal and vertical coordinates, respectively. The weight for the i-th block is computed as follows, $$\alpha_i = a_1\left(1 - \left|b_X - \frac{B_X}{2}\right|\frac{2}{B_X}\right)\left(1 - \left|b_Y - \frac{B_Y}{2}\right|\frac{2}{B_Y}\right) + a_2,$$

where $(a_1+a_2)$ and $a_2$ are the height and offset of the pyramid, respectively, and $b_X$ and $b_Y$ are the horizontal and vertical position of the block in the frame. For example, choosing $a_1=15$ and $a_2=1$ causes the $\alpha_i$ value of the center block to be 16 times that of boundary blocks.

Block Joining

In a codec, the values of the quantizer values used $Q^*_1, \ldots, Q^*_N$ (see step 2 above) need to be encoded and sent to the decoder. For example, in H.263, quantizer values are encoded in a raster-scan order and there is a five-bit penalty for changing the quantizer value. At high bit rates, the bit overhead for changing the quantizer values is negligible and the optimization techniques described above are effective. However, at very-low bit rates, this overhead is significant and some technique is needed for constraining the number of times that the quantizer changes. Unfortunately, existing optimization methods that take quantization overhead into account are mathematically inaccurate or computationally expensive.

In another aspect of the invention, a heuristic method joins blocks of similar standard deviation together into a set so that the quantizer value remains constant within the set. This technique is referred to as block joining, and reduces the changes of the quantizer at lower bit rates. Block joining is accomplished by choosing the values of the $\alpha_i$ weights as follows, $$\alpha_i = \begin{cases} 2\frac{B}{AN}(1-\sigma_i)+\sigma_i & \frac{B}{AN} < 0.5 \\ 1 & \text{otherwise} \end{cases}$$

where $B/(AN)$ is the bit rate in bits per pixel for the current frame. The values of B, A, and N were defined earlier as the number of bits available, number of pixels in a block, and number of blocks, respectively. If the bit rate is above 0.5, the $\alpha_i$'s are all equal to 1 and hence have no effect. At lower bit rates, the $\alpha_i$'s linearly approach the respective $\sigma_i$'s and progressively reduce the range of the $Q^*$'s. In fact, if the bit rate is 0, then $\alpha_i=\sigma_i$ and all the quantizer values are equal, and hence all blocks are joined into one set, $$Q^*_1 = \ldots = Q^*_N = \sqrt{\frac{AK}{(B-ANC)}\sum_{k=1}^{N}\sigma_k^2}.$$

Figure 6:
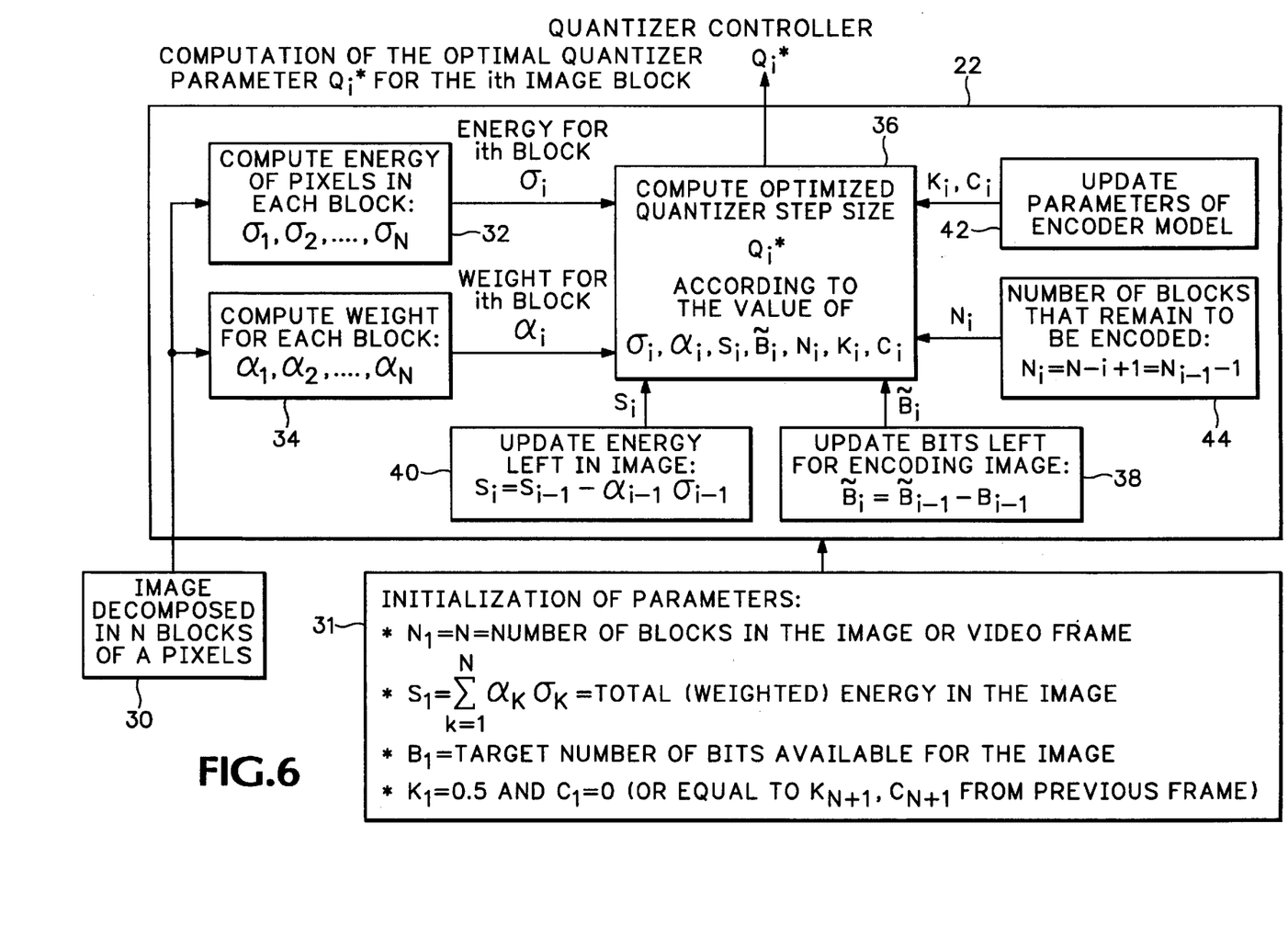
FIG. 6 is a block diagram of the quantizer controller according to one embodiment of the invention.

FIG. 6 is a detailed block diagram of the quantizer controller 22 shown in FIG. 2. The quantizer controller 22 in one embodiment is implemented in a general purpose programmable processor. The functional blocks in FIG. 6 represent the primary operations performed by the processor. Initialization parameters in block 31 are either derived from pre-processing the current image or from parameters previously derived from previous frames or from prestored values in processor memory (not shown). Initialization parameters include $N_1, S_1, B_1, K_1,$ and $C_1$ (or $K_{N+1}$ and $C_{N+1}$ from a previous frame).

The image is decomposed into N image blocks 14 (FIG. 2) of A pixels in block 30. The energy of the pixels in each block is computed in block 32. The weight factors assigned to each block are computed in block 34. The amount of energy left in the image is updated in block 40 and the bits left for encoding the image are updated in block 38. Parameters for the encoder model are updated in block 42 and the number of blocks remaining to be encoded are tracked in block 44. The processor in block 36 then computes the optimized quantizer step size according to the values derived in blocks 32, 34, 40, 38, 42 and 44.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for encoding multiple blocks in a frame of image data, comprising:

identifying a target bit value equal to a total number of bits available for encoding the frame;

predicting a total distortion in the frame according to predicted quantization values individually customized and assigned to each one of the blocks in the frame, the quantization values predicted for each one of the blocks according to a quantization step size model that characterizes quantization step size values according to an amount of energy in that block and a number of bits assigned to that block; said quantization step size model not relying upon selection of a quantization step size variable;

the quantization step size model individually adapting optimum quantization step size values for each of the multiple blocks by minimizing the total predicted distortion in the frame subject to a constraint that the total number of bits available for encoding the frame is equal to the target bit value; and encoding the blocks with the predicted optimum quantization step size values.

2. A method according to claim 1 wherein the optimum quantization values are generated using a Lagrange optimization on the predicted total distortion.

3. A method for encoding multiple blocks in a frame of image data, comprising:

identifying a target bit value equal to a total number of bits available for encoding the frame;

predicting a total distortion in the frame according to quantization values assigned to each one of the blocks, the quantization values characterized according to an amount of energy in each block and a number of bits assigned to each block;

adapting optimum quantization values for each of the multiple blocks by minimizing the total predicted distortion in the frame subject to a constraint that the total number of bits available for encoding the frame is equal to the target bit value; and encoding the blocks with the predicted optimum quantization values, wherein the optimum quantization values are derived according to the following, $$Q^*_i = \sqrt{\frac{AK}{(B-ANC)}\frac{\sigma_i}{\alpha_i}\sum_{k=1}^{N}\alpha_k\sigma_k},$$

where, $Q_i^*$ is the optimum quantization value for each block i, N is the number of blocks in the frame, B is the total number of bits available for encoding the frame, A is a number of pixels in each of the multiple blocks, K and C are constants associated with the image blocks, $\sigma_i$ is an empirical standard deviation of pixel values in the block, and $\alpha_i$ is a weighting incorporating the importance of distortion in the block.

4. A method according to claim 1 including adjusting the optimum quantization values according to a number of image blocks remaining to be encoded and a number of bits still available for encoding the remaining image blocks.

5. A method according to claim 3 including using a K parameter and a C parameter on a block-by-block basis to adjust the optimum quantization values for each of the multiple blocks, the K parameter modeling correlation statistics of the pixels in the image blocks and the C parameter modeling bits required to code overhead data.

6. A method according to claim 5 including deriving the optimum quantization values in either a fixed mode where the K and C parameters are known in advance or an adaptive mode where the K and C parameters are derived according to the K and C parameters of previously encoded blocks.

7. A method according to claim 6 wherein the adaptive mode includes the following steps:
   deriving values for the K and C parameters that exactly predict the number of bits B used for encoding previous blocks;
   deriving averages for the derived K and C parameters for the previously encoded video blocks; and
   predicting the K and C parameters for a next video block by linearly weighting the average K and C parameters according to the initial estimates for the K and C parameters.

8. A method according to claim 7 wherein the values of K and C that predict B are $$\hat{K}_i = \frac{(B_i' - AC_i)Q_i^{*2}}{A\sigma_i^2} \text{ and } \hat{C}_i = \frac{B_i'}{A} - K_i \frac{\sigma_i^2}{Q_i^{*2}},$$

$$\text{or } \hat{K}_i = \frac{B_{DCT,i}' Q_i^{*2}}{A\sigma_i^2} \text{ and } \hat{C}_i = \frac{B_i' - B_{DCT,i}'}{A}$$

where i is the image block currently being encoded; $\hat{K}_i$ is the value of K used to predict B for the ith image block; $\hat{C}_i$ is the value of C used to predict B for the ith image block, $B_i'$ is a number of bits for the ith image block, $B_{DCT,i}'$ is a number of bits spent for the DCT coefficients of the current image block; the average of K is $\tilde{K}_i$ and the average of C is $\tilde{C}_i$ where;

$$\tilde{K}_i = \frac{i-1}{i}\tilde{K}_{i-1} + \frac{1}{i}\hat{K}_i \text{ and } \tilde{C}_i = \frac{i-1}{i}\tilde{C}_{i-1} + \frac{1}{i}\hat{C}_i;$$

and the linearly weighted averages of K and C are, $$K_{i+1} = \frac{i}{N}\tilde{K}_i + \frac{N-i}{N}K_1 \text{ and } C_{i+1} = \frac{i}{N}\tilde{C}_i + \frac{N-i}{N}C_1;$$

respectively.

9. A method according to claim 3 wherein the amount of energy in the frame is not determined in advance and is estimated according to the following where, $\sigma_k$ is an empirical standard deviation of pixel values in a previously encoded video frame and $\alpha_k$ is a weighting factor incorporating distortion in a previously encoded video frame.

10. A method according to claim 9 including encoding the image blocks several times to estimate parameters $K_1$, $K_2$, ... $K_n$ and $C_1$, $C_2$, ..., $C_n$ for each of the image blocks and then deriving a super optimum quantization value by setting:

$$Q_i^* = \sqrt{\frac{A\sqrt{K_i}}{\left(\tilde{B}_i - A\sum_{i=1}^{N} C_i\right)} \frac{\sigma_i}{\alpha_i} S_i},$$

where, $$S_1 = \sum_{k=1}^{N} \sqrt{K_k}\, \sigma_k \alpha_k \text{ and } S_{i+1} = S_i - \sqrt{K_i}\, \sigma_i \alpha_i.$$

11. A method according to claim 1 including predicting optimum quantization values for each frame according to the following steps:
   identifying a multiframe bit value equal to a total number of bits available for encoding multiple frames;
   modeling a total amount of distortion in the multiple frames according to quantization values assigned to each one of the frames, the quantization values characterized according to an amount of energy in each frame and a number of bits assigned to each frame;
   predicting optimum quantization values for each frame that minimize the total modeled distortion in the multiple frames; and
   encoding each frame with the predicted optimum quantization value.

12. A method according to claim 1 including applying weighting factors to each of the optimum quantization values according to location of the blocks in the frame.

13. A method according to claim 1 including controlling a number of different optimum quantization values assignable to the blocks by assigning the same quantization values to blocks having similar standard deviation values.

14. A method for encoding multiple blocks in a frame of image data, comprising:
   identifying a target bit value equal to a total number of bits available for encoding the frame;
   predicting a total distortion in the frame according to quantization values assigned to each one of the blocks, the quantization values characterized according to an amount of energy in each block and a number of bits assigned to each block;
   adapting optimum quantization values for each of the multiple blocks by minimizing the total predicted distortion in the frame subject to a constraint that the total number of bits available for encoding the frame is equal to the target bit value;
   encoding the blocks with the predicted optimum quantization values; and
   controlling a number of different optimum quantization values assignable to the blocks by assigning the same quantization values to blocks having similar standard deviation values, wherein the optimum quantization values are scaled by a weighting value $\alpha_i$ as follows:

$$\alpha_i = \begin{cases} 2\frac{B}{AN}(1-\sigma_i) + \sigma_i & \frac{B}{AN} < 0.5 \\ 1 & \text{otherwise} \end{cases},$$

where B/(AN) is the bit rate in bits per pixel for a current frame, B is the number of bits available, A is a number of pixels in the block, N is the total number of blocks in the frame, and $\sigma_i$ is the standard deviation for the pixels in the blocks.

15. A method for quantizing regions in a video image, comprising:
   receiving image information for different regions;
   predicting an amount of distortion created in the video image according to quantization step size values assigned to the individual regions according to a quantization step size model that predicts individual quantization step size values for each one of the individual regions, the predicted distortion characterized in the quantization step size model according to the amount of information in the region and the number of bits available for encoding the information in the regions with the quantization values; said quantization step size model not relying upon selection of a quantization step size variable;

optimizing the predicted quantization step size values from the quantization step size model so that the amount of predicted distortion in the regions is minimized for the number of available bits when the optimized quantization step size values are used to encode the regions; and encoding the regions with the optimized quantization values.

16. A method for quantizing regions in a video image, comprising:

receiving image information for different regions;

predicting an amount of distortion created in the video image according to quantization values assigned to the regions, the predicted distortion characterized according to the amount of information in the region and the number of bits available for encoding the information in the regions into the quantization values;

optimizing the quantization values assigned to the regions so that the amount of predicted distortion in the regions is minimized for the number of available bits; and encoding the regions with the optimized quantization values, wherein the optimized quantization values are derived as follows, $$Q_i^* = \left( \frac{KA_i^{\frac{\gamma}{\gamma+2}} \sigma_i^{\phi\frac{\gamma}{\gamma+2}}}{\tilde{B}_i - C\sum_{n=i}^{N} A_n \alpha_i^{\frac{2\gamma}{\gamma+2}}} S_i \right)^{\frac{1}{\gamma}},$$

where, $$S_1 = \sum_{n=1}^{N} (A_n \sigma_n^\phi)^{\frac{2}{\gamma+2}} \alpha_n^{\frac{2\gamma}{\gamma+2}},$$

$$S_{i+1} = S_i - (A_i \sigma_i^\phi)^{\frac{2}{\gamma+2}} \alpha_i^{\frac{2\gamma}{\gamma+2}},$$

$\gamma$, $\phi$, K and C are constants, $A_i$ is a number of pixels in an ith region, $\sigma_i$ represents energy of the pixel values for the ith region, $\tilde{B}_i$ represents the number of bits available and $\alpha_i$ is a weighting factor incorporating importance of the region distortion.

17. A method according to claim 15 wherein the optimized quantization values for a selected region is derived as follows:

summing the energy in each of the regions to determine a total energy in the video image;

multiplying the total energy with an amount of energy in the selected region;

scaling the multiplied energies according to a scaling factor; and squaring the scaled energies thereby generating the optimized quantization value for the selected region.

18. A method according to claim 17 wherein scaling the multiplied energies includes the following:

applying a first scaling factor proportional to the number of regions in the frame remaining to be quantized; and applying a second scaling factor that varies for each region according to a total number of bits available for encoding the frame and a total number of bits already used to encode previous regions in the frame.

19. A method according to claim 18 including applying a third and fourth scaling factor, the third scaling factor modeling correlation statistics in the region and the fourth scaling factor representing overhead data in the encoded frame.

20. A method according to claim 19 including applying a fifth scaling factor proportional to a number of pixels in each region.

21. A method according to claim 15 wherein the energy in each region is proportional to a standard deviation for pixel values or a sum of the absolute values of the pixels in relation to an average of all pixel values in the same region.

22. A method according to claim 15 including predicting the total energy in the video image by taking the total energy for a previous video image.

23. A method according to claim 15 wherein the predicted optimum quantization values are reduced for the blocks having less energy and the predicted optimum quantization values are increased for the blocks having more energy.

24. A method according to claim 21 wherein the energy is adjusted by a scaling value for the pixels in intracoded regions, the scaling value characterized according to a ratio of two values $K_I$ and $K_P$, where $K_I$ represents correlation statistics of pixel values in intracoded regions, and $K_P$ represents correlation statistics of pixels in interceded regions.

25. An encoder for quantizing regions in video frames, comprising:

a circuit for detecting an amount of video information in one of the regions;

a quantizer controller predicting and then assigning quantization step size values that are customized for each one of the individual regions wherein the quantization values are predicted according to a quantization step size model, the predicted quantization step size values minimizing an amount of predicted distortion in the video frames for a target bit value, the quantizer controller predicting an amount of distortion created in the video frames before the information in the region is actually quantized and adapting the predicted quantization step size values derived for each region to minimize the predicted distortion according to an amount of energy in that region and a constraint that a total number of available bits for encoding the frames is equal to the target bit value; said quantization step size model not relying upon selection of a quantization step size variable; and a quantizer quantizing the video information in the regions according to the adapted quantization values associated with the regions generated from the quantizer controller.

26. An encoder according to claim 25 including a transform circuit receiving the video image at an input and generating transform coefficients at an output, the quantizer quantizing the transform coefficients for each region according to the associated quantization values.

27. An encoder according to claim 25 wherein the quanitizer controller predicts the quantization step size values as follows:

summing the energy in each of the regions of one of the video frames to determine a total energy;

multiplying the total energy with an amount of energy in a selected one of the regions;

scaling the multiplied energies according to a scaling factor; and squaring the scaled energies thereby generating the optimized quantization step size value for the selected one of the regions.

28. A method according to claim 1 wherein predicting the quantization step size value for one of the blocks comprises the following:

determining a total amount of energy in the frame;

multiplying the total amount of energy with the energy in that block to form a first intermediate value;

applying a scaling factor to the intermediate value to generate a second intermediate value; and squaring the second intermediate value.

* * * * *

UNITED STATES PATENT AND TRADEMARK OFFICE
CERTIFICATE OF CORRECTION

PATENT NO.    : 6,111,991
DATED         : August 29, 2000
INVENTOR(S)   : Jordi Ribas-Corbera et al.

It is certified that error appears in the above-identified patent and that said Letters Patent is hereby corrected as shown below:

Title page,
Item [56], References Cited, U.S. PATENT DOCUMENTS, should also include:
-- 5,134,475, 07/28/92, Johnston, et al.
   5,144,423, 09/01/92, Knauer, et al.
   5,374,958, 12/20/94, Yanagihara
   5,475,501, 12/12/95, Yagasaki
   5,550,590, 08/27/96, Sakazawa, et al.
   5,606,371, 02/25/97, Klein Gunnewiek, et al.
   5,627,581, 05/06/97, Kondo
   5,734,755, 03/31/98, Ramchandran, et al.
   5,038,209, 08/06/91, Hang
   5,159,447, 10/27/92, Haskell, et al.
   5,241,383, 08/31/93, Chen, et al.
   5,274,443, 12/28/93, Dachiku, et al.
   5,283,646, 02/01/94, Bruder
   5,323,187, 06/21/94, Park
   5,426,463, 06/20/95, Reininger, et al.
   5,475,433, 12/12/95, Jeong
   5,508,745, 04/16/96, Jo --

Item [56], OTHER PUBLICATIONS, insert:
-- "Bit Allocation for Dependent Quantization with Applications to Multiresolution and MPEG Video Coders" written by Kannan Ramchandran, Antonio Ortega and Martin Vetterli, *IEEE Transactions on Image Processing*, Volume 3, No. 5, September 1994, pp. 533-545

"Rate Control Using Spline-Interpolated R-D Characteristics" written by Liang-Jin Lin, Antonio Ortega and C.-C. Jay Kuo, Signal and Image Processing Institute and Department of Electrical Engineering Systems, University of California, Los Angeles, 12 pages "Rate Control of MPEG Video Coding and Recording by Rate-Quantization Modeling" written by Wei Ding and Bede Liu, *IEEE Transactions on Circuits and Systems for Video Technology*, Volume 6, No. 1, February 1996, pp. 12-20 --

UNITED STATES PATENT AND TRADEMARK OFFICE
CERTIFICATE OF CORRECTION

PATENT NO. : 6,111,991
DATED : August 29, 2000
INVENTOR(S) : Jordi Ribas-Corbera et al.

It is certified that error appears in the above-identified patent and that said Letters Patent is hereby corrected as shown below:

Column 4,
Line 36, "to be interceded" should read -- to be intercoded --

Column 5,
Line 8, "K= π/In 2" should read -- K= π/ln 2 --
Lines 41-45,

"$Q_i,...Q_N = \begin{array}{c} \arg\min \\ Q_1 ... Q_N \end{array} \frac{1}{N} \sum_{j=1}^{N} a_j^2 \frac{Q_j^2}{12}$" should read:

$\sum_{j=1}^{N} Bj = B$

--

(correction applies to bottom line of equation) $\sum_{j=1}^{N} Bj = B$ --

Column 6,
Lines 16-19, reads "$\dfrac{AK_i}{\left(B_i - \tilde{A}N_i C_i\right)}$"

should read (correction applies to denominator) -- $\dfrac{AK_i}{\left(B_i - \tilde{A}N_i C_i\right)}$ --

Line 33, reads "$Q_{i-1}*$" should read -- $Q^*_{i-1}$ --

Column 7,
Line 28, reads ... "Quantizer controller" should read -- Quantizer Controller --.

UNITED STATES PATENT AND TRADEMARK OFFICE
CERTIFICATE OF CORRECTION

PATENT NO. : 6,111,991
DATED : August 29, 2000
INVENTOR(S) : Jordi Ribas-Corbera et al.

It is certified that error appears in the above-identified patent and that said Letters Patent is hereby corrected as shown below:

<u>Column 8,</u>
Lines 59-60, " factor $\sqrt[3]{\sqrt{B}}$ " reads should read -- factor $\sqrt{B}$ --

<u>Column 10,</u>
Line 19, reads "$B_{DCT,i'}$" should read: -- $B'_{DCT,i}$ --

<u>Column 12,</u>
Lines 16-18, reads "to that block; said quantization step size model not relying upon selection of a quantization step size variable" should read -- to that block; --
Line 29, reads "the predicted total distortion." should read -- the predicted total distortion generated by the quantization step size model, the quantization step stize model not relying upon selection of a quantization step size variable. --

<u>Column 15,</u>
Lines 8-10, reads "with the quantization values; said quantization step size....." should read -- with the quantization values; --

<u>Column 16,</u>
Line 30, reads "interceded" should read -- intercoded --
Lines 37-39, reads "regions wherein the quantization...size model, the predicted" should read -- regions, the predicted --
Lines 49-51, reads "target bit value, said quantization step size... step size variable; and" should read -- target bit value; and --

Signed and Sealed this

Twenty-fifth Day of February, 2003

JAMES E. ROGAN
*Director of the United States Patent and Trademark Office*